United States Patent
Eto et al.

(10) Patent No.: US 7,987,044 B2
(45) Date of Patent: Jul. 26, 2011

(54) CONTROL DEVICE FOR INTERNAL COMBUSTION ENGINE

(75) Inventors: Daisuke Eto, Mito (JP); Mitsuhiko Watanabe, Odawara (JP); Ryoichi Oura, Hitachinaka (JP); Takuya Mayuzumi, Hitachinaka (JP); Masahiro Toyohara, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 399 days.

(21) Appl. No.: 12/341,197

(22) Filed: Dec. 22, 2008

(65) Prior Publication Data

US 2009/0159047 A1   Jun. 25, 2009

(30) Foreign Application Priority Data

Dec. 25, 2007 (JP) ................. 2007-332554

(51) Int. Cl.
G06F 19/00 (2006.01)
F02M 51/00 (2006.01)
F02D 41/30 (2006.01)
(52) U.S. Cl. ......... 701/114; 123/478; 123/494; 701/104
(58) Field of Classification Search ............. 123/41.31, 123/478, 480, 490, 494; 701/101–105, 114, 701/115
See application file for complete search history.

(56) References Cited

U.S. PATENT DOCUMENTS

| 4,724,816 A * | 2/1988 | Kanno et al. ............ 123/478 |
| 6,363,315 B1 * | 3/2002 | Love et al. .............. 701/104 |
| 7,415,964 B2 * | 8/2008 | Ban ....................... 123/299 |
| 2003/0106531 A1 * | 6/2003 | Saeki et al. ............. 123/435 |
| 2005/0126542 A1 | 6/2005 | Oono |
| 2007/0240675 A1 | 10/2007 | Ban |

FOREIGN PATENT DOCUMENTS

| JP | 2000282998 A | * | 10/2000 | ............ 123/490 |
| JP | 2001-227392 A | | 8/2001 | |
| JP | 2005-180217 A | | 7/2005 | |
| JP | 2005-201091 | | 7/2005 | |
| JP | 2005-201091 A | | 7/2005 | |
| JP | 2005201091 A | * | 7/2005 | ............ 123/490 |
| JP | 2007285139 A | * | 11/2007 | ............ 123/299 |

OTHER PUBLICATIONS

Japanese Office Action dated Feb. 15, 2911 (Three (3) pages).

* cited by examiner

Primary Examiner — Willis R Wolfe, Jr.
(74) Attorney, Agent, or Firm — Crowell & Moring LLP

(57) ABSTRACT

A control device 10 for an internal combustion engine 80 includes an injector drive circuit 90 that drives an injector 30 that injects fuel and a temperature detection device that at least detects timing when a temperature condition that the temperature of the injector drive circuit 90 exceeds predetermined temperature is satisfied. The control device 10 includes a heat-generation-suppression control means 104 that performs control for suppressing the heat generation of the injector drive circuit 90. The heat-generation-suppression control means 104 selects, on the basis of a driving state of a vehicle, at least one parameter among an electric current applied to the injector, fuel pressure supplied to the injector 30, the number of revolutions of the internal combustion engine, and voltage from a battery to be boosted and performs control for limiting a value of the selected parameter on the basis of the timing.

16 Claims, 8 Drawing Sheets

CONTROL DEVICE FOR INTERNAL COMBUSTION ENGINE

BACKGROUND OF THE INVENTION

1. Field of the Invention

The present invention relates to a control device for an internal combustion engine, and, more particularly to a control device for an internal combustion engine that suppresses heat generation of a driving circuit of an injector.

2. Background Art

An injector that injects fuel into an internal combustion engine injects the fuel with an electric current from an injector drive circuit applied thereto. However, when energization time and the number of times of energization for the injector increase, power consumption of the injector drive circuit increases. As a result, a control device including the injector drive circuit generates heat.

In particular, in the case of a cylinder injection internal combustion engine, the pressure of fuel that should be injected has to be set high. Therefore, the injector drive circuit includes a circuit for boosting the voltage from a battery. The injector drive circuit has to energize the injector with the voltage boosted by using the circuit. As a result, an electric current flowing to the injector drive circuit is large compared with that in the past. The injector drive circuit more easily generates heat and tends to break down, which is likely to lead to the failure of the control device.

In order to prevent the failure of the control device due to the heat generation, a temperature detection device that detects the temperature of the injector drive circuit is provided. When it is judged that the detected temperature exceeds predetermined temperature (shutdown temperature) and is excess temperature, the normal control of the internal combustion engine is stopped and the driving of the injector drive circuit is stopped (shut down). When the detected temperature falls to be equal to or lower than the predetermined temperature, the shutdown is released and the normal control is resumed.

However, even if such a measure is taken, when the detected temperature does not exceeds the shutdown temperature and the normal control is continuously performed near the shutdown temperature, a temperature rise due to the heat generation of the injector drive circuit is accelerative. As a result, the temperature of the injector drive circuit easily exceeds the shutdown temperature and an engine of a vehicle is stopped.

In view of such a point, a control device for an internal combustion engine disclosed in JP Patent Publication (Kokai) No. 2005-201091 (Patent Document 1) performs control to inject fuel plural times in one combustion stroke. When temperature detected from an injector drive circuit exceeds predetermined temperature equal to or lower than maximum operation guarantee temperature of the injector drive circuit, the control device performs, according to the excess temperature, control for driving an injector via the injector drive circuit to reduce the number of times of injection of the fuel per one stroke. With such a control device, it is possible to suppress the heat generation of the injector drive circuit and keep the temperature of the injector drive circuit within a range of operation guarantee temperature by reducing the number of times of fuel injection.

SUMMARY OF THE INVENTION

The control device for an internal combustion engine disclosed in Patent Document 1 reduces the number of times of fuel injection per one combustion stroke and limits the number of times of energization of the injector drive circuit per one combustion stroke as the control for suppressing the heat generation of the injector drive circuit. However, when the number of times of energization of the injector drive circuit is limited, a fuel injection amount may decrease to suddenly change the speed of a vehicle (vehicle speed).

The suppression of the heat generation of the injector drive circuit depends not only on the number of times of the application of an electric current of the injector drive circuit but also on the magnitude of the electric current and the like. The heat generation may not be sufficiently suppressed simply by limiting the number of times of energization. Moreover, when the number of times of energization is limited in this way, the speed of the vehicle (vehicle speed) changes and the influence on a driver is serious. It is also likely that comfortableness of vehicle driving is spoiled.

The present invention has been devised in view of the problems described above and it is an object of the present invention to provide a control device for an internal combustion engine that can efficiently suppress the heat generation of an injector drive circuit with respect to a temperature rise corresponding to a driving state of a vehicle and prevent the suppression of the heat generation from affecting the driving of the vehicle.

In order to solve the problems, a control device for an internal combustion engine according to the present invention includes an injector drive circuit that drives an injector that injects fuel into the internal combustion engine and a temperature detection device that detects timing when a temperature condition that the temperature of the injector drive circuit exceeds predetermined temperature is satisfied. The control device includes heat-generation-suppression control means for performing control for suppressing the heat generation of the injector drive circuit. The heat-generation-suppression control means selects, on the basis of a driving state of a vehicle, at least one parameter among an electric current applied to the injector, fuel pressure supplied to the injector, the number of revolutions of the internal combustion engine, and voltage from a battery to be boosted and performs control for limiting a value of the selected parameter on the basis of the timing.

Preferably, the control device for an internal combustion engine calculates, as the driving state of the vehicle, time elapsed from the timing when the temperature of the injector drive circuit exceeds the predetermined temperature and the heat-generation-suppression control means selects the parameter according to the elapsed time.

A control device for an internal combustion engine according to the present invention includes an injector drive circuit that drives an injector that injects fuel into the internal combustion engine and a temperature detection device that detects the temperature of the injector drive circuit. The control device includes heat-generation-suppression control means for performing control for suppressing the heat generation of the injector drive circuit. The heat-generation-suppression control means selects, on the basis of a driving state of a vehicle, at least one parameter among an electric current applied to the injector, fuel pressure supplied to the injector, the number of revolutions of the internal combustion engine, and voltage from a battery to be boosted and performs control for limiting a value of the selected parameter on the basis of the detected temperature.

Preferably, the heat-generation-suppression control means of the control device for an internal combustion engine according to the present invention performs the control for limiting a value of the parameter when a temperature condition that the detected temperature exceeds predetermined temperature is satisfied.

Preferably, the control device for an internal combustion engine calculates, as the driving state of the vehicle, time elapsed after the detected temperature exceeds the predetermined temperature and the heat-generation-suppression control means selects the parameter according to the elapsed time.

As another aspect of the present invention, preferably, the control device for an internal combustion engine according to the present invention calculates, as the driving state of the vehicle, a difference between the predetermined temperature and the detected temperature and the heat-generation-suppression control means selects the parameter according to the difference.

As still another aspect of the present invention, preferably, the control device for an internal combustion engine further includes temperature estimating means for estimating the temperature of the injector drive circuit after the elapse of predetermined time from detection time of the temperature and performs control for limiting a value of the parameter when a temperature condition that the estimated temperature exceeds the predetermined temperature is satisfied.

Preferably, the heat-generation-suppression control means of the control device for an internal combustion engine sequentially selects, according to a driving state of the vehicle, the parameters of the electric current applied to the injector, the fuel pressure supplied to the injector, the number of revolutions of the internal combustion engine, and the voltage from the battery to be boosted and performs control for limiting values of the parameters in the order of the selection.

Preferably, the control device for an internal combustion engine according to the present invention calculates vehicle speed as a driving state of the vehicle and the heat-generation-suppression control means selects the parameters on the basis of the vehicle speed. Preferably, the control device for an internal combustion engine selects the parameters in order from one with which the calculated vehicle speed most hardly changes.

Preferably, the heat-generation-suppression control means of the control device for an internal combustion engine continuously performs, when the satisfaction of the temperature condition changes to dissatisfaction, the heat generation suppression control until predetermined time elapses after the satisfaction changes to the dissatisfaction.

Preferably, the control device for an internal combustion engine according to the present invention further includes information means for informing, when the temperature condition is satisfied, the satisfaction of the temperature condition. Preferably, the information means informs, when the satisfaction of the temperature condition changes to dissatisfaction, the dissatisfaction of the temperature condition.

According to the present invention, it is possible to efficiently suppress, according to a driving state of a vehicle, the heat generation of the injector drive circuit with respect to even a sudden temperature rise and it is possible to prevent the suppression of the heat generation from affecting the driving state of the vehicle and secure comfortableness of vehicle driving.

DETAILED DESCRIPTION OF THE PREFERRED EMBODIMENTS

Several embodiments of the present invention are explained below with reference to the accompanying drawings.

First Embodiment

Figure 1:
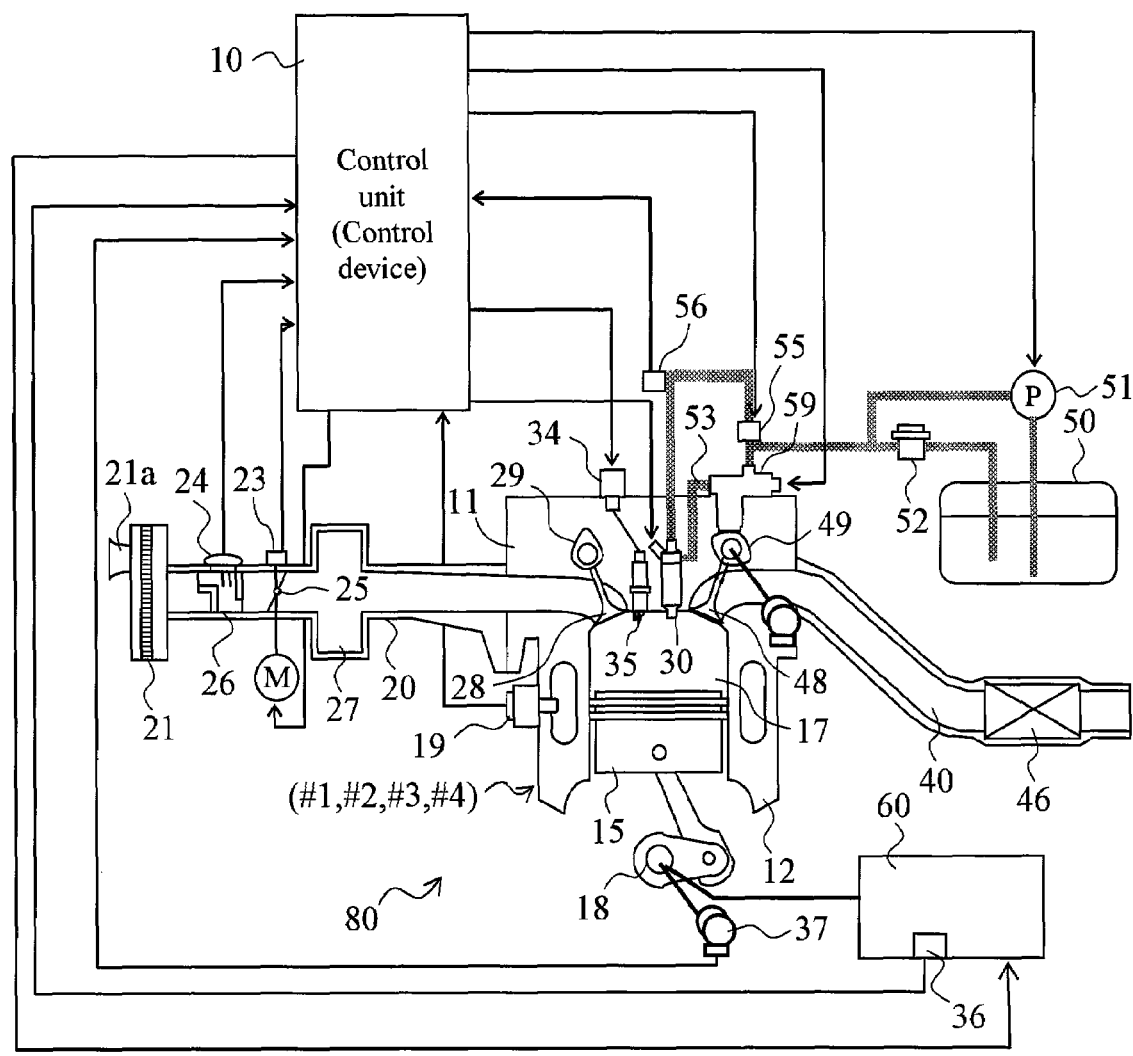
FIG. 1 is an overall diagram of a cylindrical injection internal combustion engine and a control device for the internal combustion engine according to a first embodiment of the present invention.

FIG. 1 is an overall diagram of a cylindrical injection internal combustion engine and a control device for the internal combustion engine according to a first embodiment of the present invention.

A cylindrical injection engine 80 shown in the figure is a multi-cylinder engine, for example, an in-line four cylinder engine having four cylinders #1 to #4. The cylindrical injection engine 80 includes cylinder heads 11, cylinder blocks 12, and pistons 15 fittingly inserted in the cylinder blocks 12 to freely slide. Combustion chambers 17 are defined above the pistons 15.

Ignition plugs 35 to which high voltage is applied from an ignition coil 34 and injectors 30 that directly inject fuel into the combustion chambers 17 are provided to face the combustion chambers 17. In the figure, for convenience of illustration, the ignition plugs 35 and the injectors 30 are provided in parallel on the left and right of ceiling portions of the combustion chambers 17. However, arranging positions of the ignition plugs 35 and the injectors 30 can be set as appropriate.

The air led into the respective cylinders and served for combustion of the fuel is taken in from an inlet 21 of an air cleaner 21 provided at a start end of an intake passage 20, passes through an air flow meter (an air flow sensor) 24, and enters a collector 27 through a throttle body 26 in which the electrically-controlled throttle valve 25 is housed. The air in the collector 27 is led from the collector 27 to the combustion chambers 17 of the respective cylinders via a branching passage (an intake pipe and an intake port) forming a downstream portion of the intake passage 20 and an intake valve 28 driven to open and close by an intake cam shaft 29.

An air-fuel mixture of the air taken into the combustion chambers 17 and the fuel injected from the injectors 30 is ignited and exploded and combusted by the ignition plugs 35. Combustion exhaust gas of the air-fuel mixture is discharged to an exhaust passage 40 via exhaust valves 48 driven to open and close by exhaust camshafts 49. The combustion exhaust gas is discharged to the outside after being cleaned by a catalytic converter 46 disposed in the exhaust passage 40.

A signal representing an intake flow rate is outputted to the control unit 10 from the air flow sensor 24. A throttle sensor 23 that detects an opening of the electrically-controlled throttle valve 25 is attached to the throttle body 26. A signal of the throttle sensor 23 is also outputted to the control unit 10.

On the other hand, fuel such as gasoline injected from the injectors 30 is primarily pressurized by a low-pressure fuel pump 51 from a fuel tank 50 and controlled to fixed pressure (e.g., 3 $kg/cm^2$) by a fuel pressure regulator 52. The pressure-controlled fuel is secondarily pressurized to higher pressure (e.g., 50 $kg/cm^2$) in a high-pressure fuel pump 59, which is driven by pump driving cams provided in the exhaust camshafts 49, and pumped to a common rail (an accumulator) 53.

The fuel pumped to the common rail 53 is supplied to the injectors 30 provided in the respective cylinders and injected into the combustion chambers 17 of the cylinders from the injectors 30. The fuel injected into the combustion chambers 17 is ignited by the ignition plugs 35 according to an ignition signal changed to high voltage by the ignition coil 34. The pressure of the fuel (fuel pressure) supplied to the injectors 30 is detected by a fuel pressure sensor 56. A signal of the fuel pressure is outputted to the control unit 10.

A crank angle sensor 37 attached to crank shafts 18 of the engine 80 detects rotating positions of the crank shafts 18. A detected signal is outputted to the control unit 10.

The torque from the crank shafts 18 is transmitted to a transmission 60. The transmission 60 is changed to a desired number of transmission steps according to a control signal from the control unit 10. The number of transmission steps is detected by a position sensor 36. A detected signal is outputted to the control unit 10.

Figure 2:
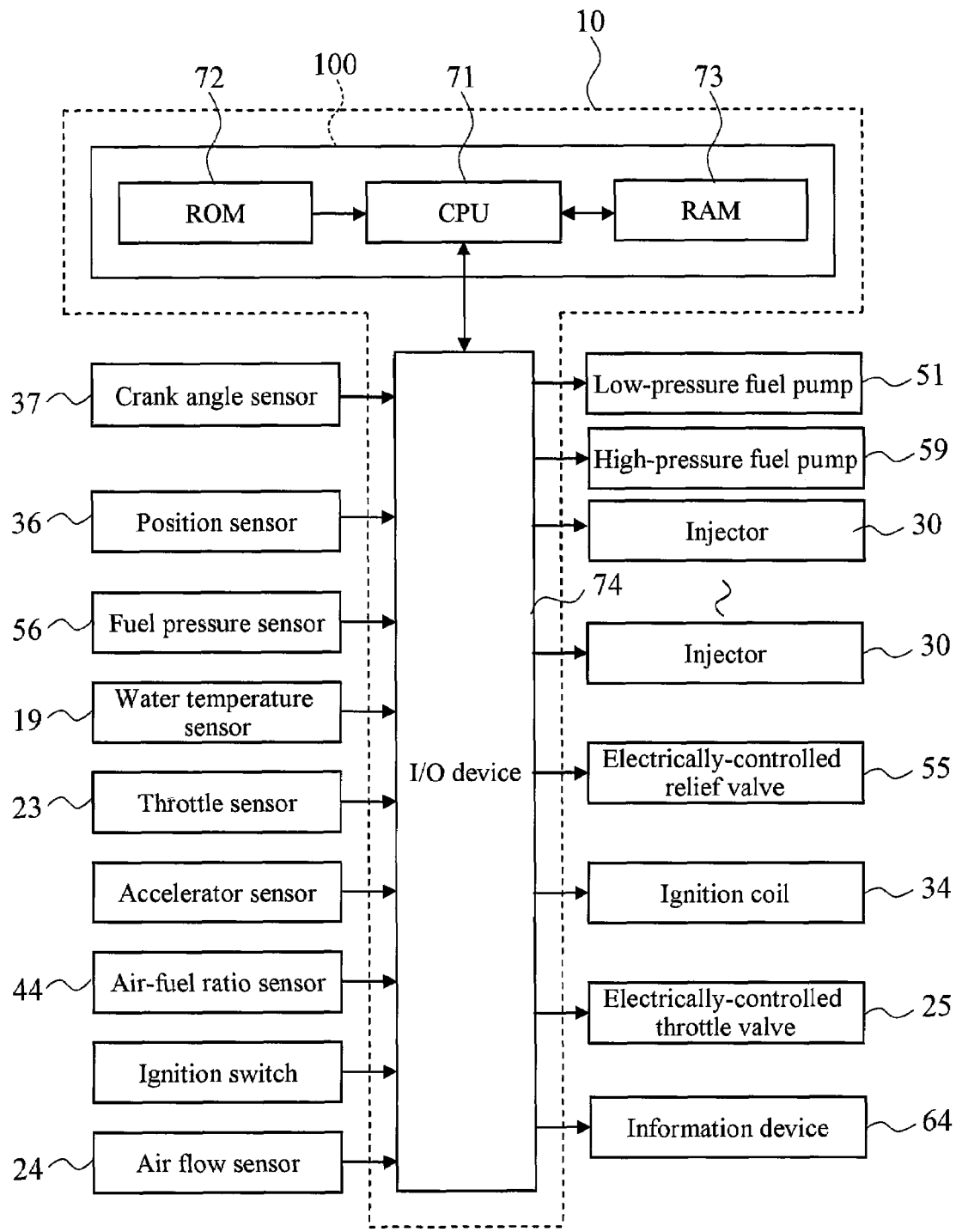
FIG. 2 is a block diagram of an internal configuration of a control unit shown in FIG. 1 and an input and an output of the control unit.

FIG. 2 is a block diagram of an internal configuration of the control unit 10 shown in FIG. 1 and an input and an output of the control unit 10. The control unit 10 is a control unit of an electronic control type including a microcomputer (arithmetic unit) 100. As shown in FIG. 2, a main part of the control unit 10 includes the microcomputer 100 including a CPU 71, a ROM 72, and a RAM 73 and an I/O device 74 including an A/D converter and a driving circuit. The control unit 10 captures, as shown in FIG. 2, signals from various sensors such as the crank angle sensor 37, the position sensor 36, and the fuel pressure sensor 56 as input signals via the I/O device 74, executes predetermined arithmetic processing, and outputs various control signals calculated as a result of the arithmetic operation as output signals.

Specifically, the control unit 10 captures, at a predetermined period, as input signals, detection (angle) signals representing rotation angles and rotation phases (rotating positions) of the crank shafts 18 detected by the crank angle sensor 37, a detection signal representing a shift position (a gear range) of a gear of the transmission 60 detected by the position sensor 36, a signal corresponding to fuel pressure detected by the fuel pressure sensor 56, a signal corresponding to engine cooling water temperature detected by water temperature sensors 19 disposed in the cylinder blocks 12, a signal corresponding to the opening of the electrically-controlled throttle valve 25 detected by the throttle sensor 23, a signal representing a step-in amount of an accelerator pedal obtained from an accelerator sensor, a signal corresponding to, for example, oxygen density in exhaust gas detected by an air-fuel ratio sensor 44 disposed in the exhaust passage 40, a signal corresponding to an intake air amount detected by the air flow sensor 24, a signal representing the start of actuation (the start of cranking) from an ignition switch, and the like.

The control unit 10 executes predetermined arithmetic processing on the basis of the captured input signal and outputs a control signal calculated as a result of this arithmetic operation to (low-pressure and high-pressure) fuel pumps, the injectors 30 and the ignition coil 34, the electrically-controlled relief valve 55, the electrically-controlled throttle valve 25, an information device 64 such as a lamp or a car navigation system that informs control information, and the like. The control unit 10 executes fuel discharge amount control, fuel injection amount control, ignition time control, opening control for the throttle valve, and the like.

Figure 3:
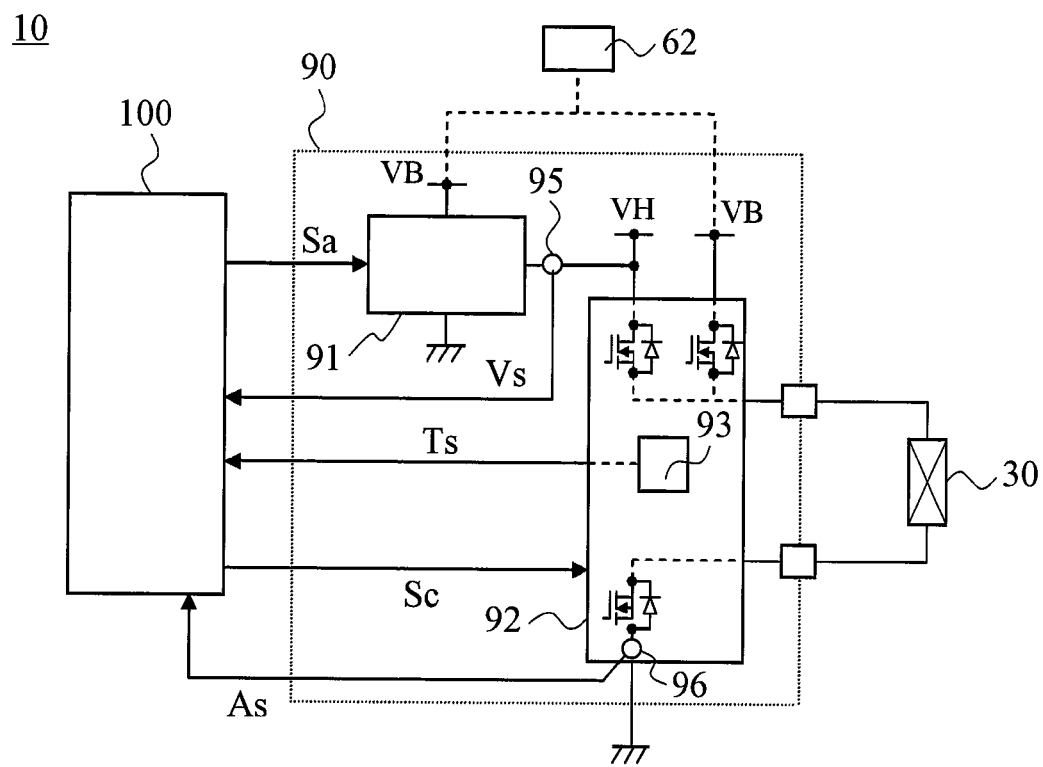
FIG. 3 is a diagram of a relation between an injector drive circuit and a microcomputer in the control device for the internal combustion engine.

FIG. 3 is a diagram for explaining a relation between an injector drive circuit 90 and the microcomputer 100 in the control device 10 for the internal combustion engine according to this embodiment.

The injector drive circuit 90 is a circuit for applying an electric current to the injectors 30 according to a driving signal Sc from the microcomputer 100 and driving the injectors 30. The injector drive circuit 90 includes a boosting circuit 91 that is connected a battery 62 of the vehicle and boosts battery voltage VB from the battery 62 according to a boosting circuit driving signal Sa from the microcomputer 100 and an injector drive element 92 that outputs an energization current for driving the injectors 30 according to boosted voltage VH and the driving signal Sc from the microcomputer 100.

The injector drive circuit 90 further includes a temperature detection device 93, a voltage detection device 95, and a current detection device 96. The temperature detection device 93 has an excess temperature diagnosis function. The excess temperature diagnosis function has two temperature thresholds. The temperature detection device 93 outputs timing when the temperature of the injector drive circuit 90 exceeds warning temperature TSET1 and timing when the temperature of the injector drive circuit 90 exceeds guarantee temperature TSET2 to the microcomputer 100.

Specifically, the temperature detection device 93 judges, with the excess temperature diagnosis function, whether the temperature TIC of the injector drive circuit is (1) equal to or lower than the warning temperature TSET1 set in advance, (2) exceeds the warning temperature TSET1 and equal to or lower than the guarantee temperature TSET2 set in advance (in an excess temperature region), or (3) exceeds the guarantee temperature TSET2. The temperature detection device 93 can at least detect timing when the temperature TIC of the injector drive circuit exceeds the warning temperatures TSET1 or the guarantee temperature TSET2 and timing when the detected temperature TIC falls below the warning temperature TSET1 or the guarantee temperature TSET2.

The warning temperature TSET1 is temperature as a threshold for performing control that should suppress the heat generation of the injector drive circuit 90 and is temperature set according to an experiment, an analysis, or the like in advance. The guarantee temperature TSET2 is maximum temperature at which the injector drive element 92 of the injector drive circuit 90 can operate. When the temperature TIC of the injector drive circuit 90 exceeds the guarantee temperature TSET2, the injector drive element 92 does not operate.

The voltage detection device 95 detects the voltage boosted by the boosting circuit 91. The voltage detection device 95 is connected to the microcomputer 100 such that a voltage detection signal Vs is outputted to the microcomputer 100. The current detection device 96 is a device that detects a current value of an electric current applied to the injectors 30. The current detection device 96 is connected to the microcomputer 100 such that a current detection signal As is outputted to the microcomputer 100.

The injector drive circuit 90 configured as described above, as shown in FIG. 4, boosts the voltage from the battery according to the boosting circuit driving signal Sa from the microcomputer 100 to the boosting circuit 91. The injector drive circuit 90 applies a peak current Ip to the injectors 30 in a predetermined injector energization period T according to the driving signal Sc from the microcomputer 100 and applies a first holding current Ib and a second holding current Ic smaller than the first holding current to the injectors 30 as an injector energization current. In this way, the injector drive circuit 90 can drive the injectors 30.

Figure 5:
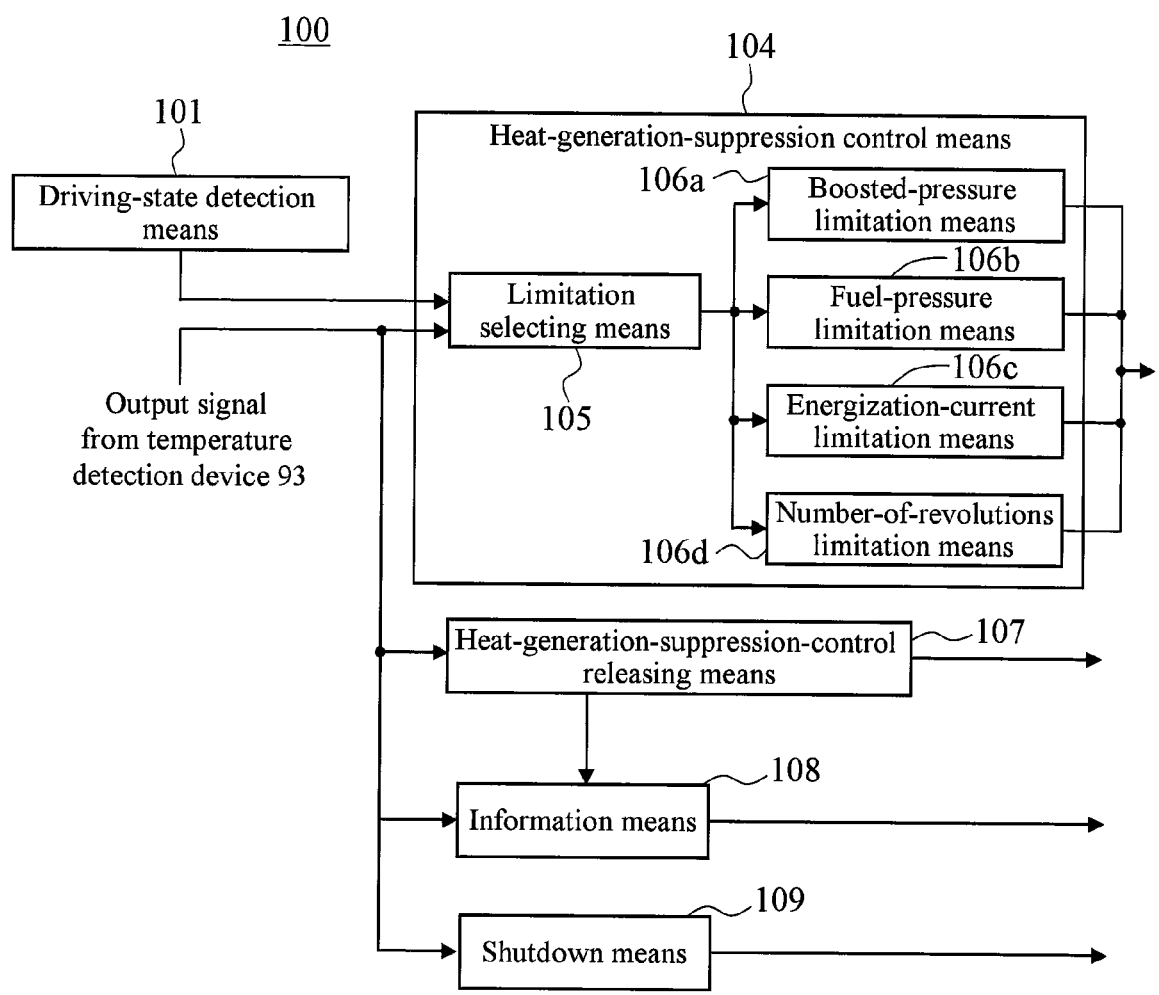
FIG. 5 is a control block diagram of a microcomputer of the control device for the internal combustion engine according to the first embodiment.
Figure 6:
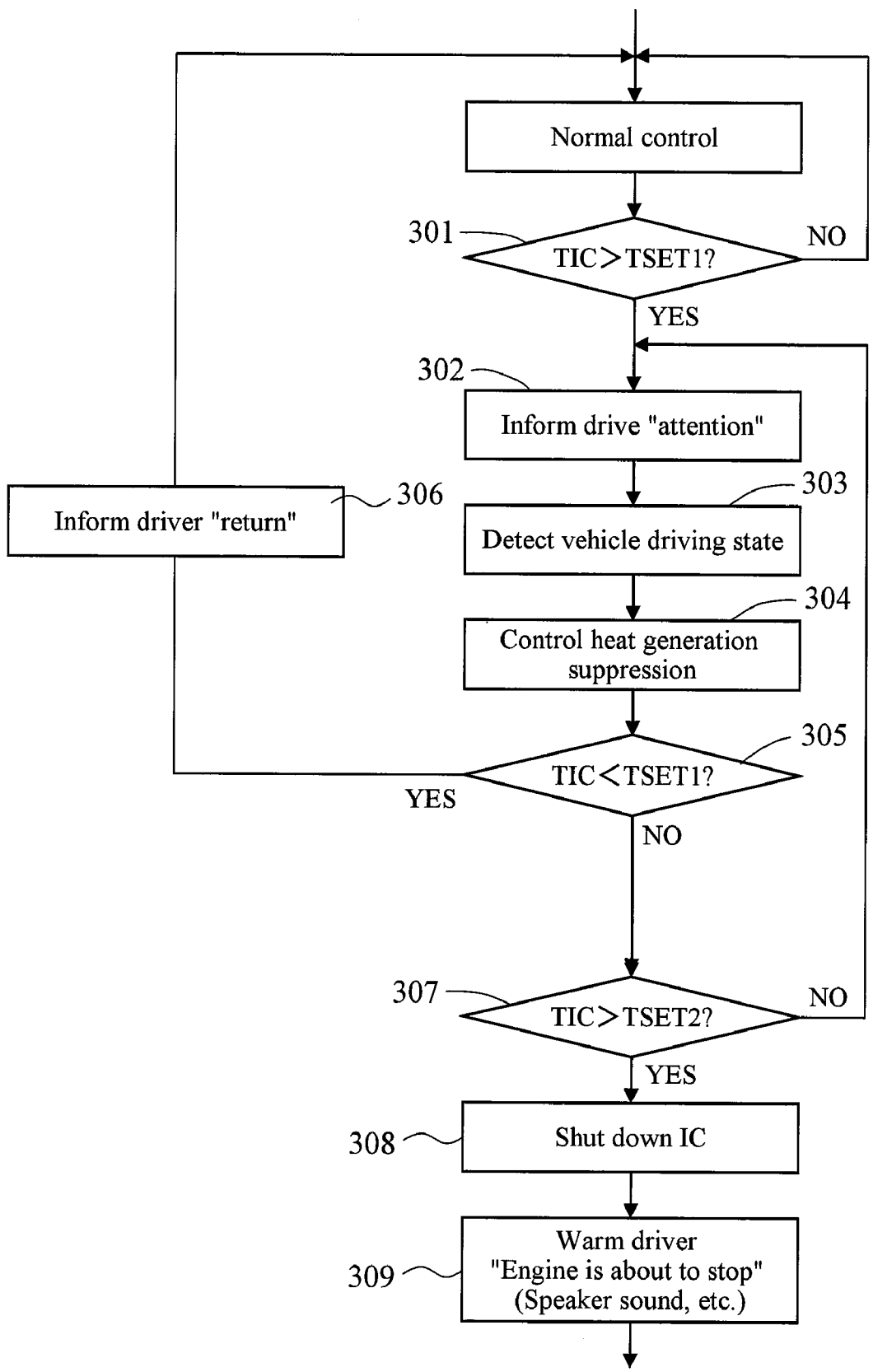
FIG. 6 is a control flowchart based on the control block diagram shown in FIG. 5.
Figure 7:
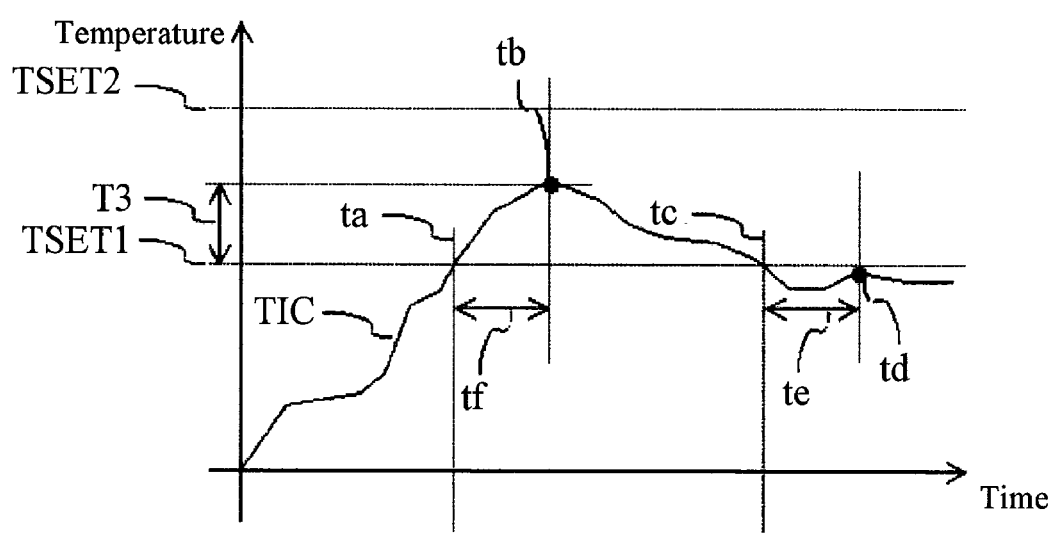
FIG. 7 is a diagram for explaining a temperature change in an injector drive element in an excess temperature region due to the control by the control device for the internal combustion engine according to the first embodiment.

FIG. 5 is a control block diagram of control performed by the microcomputer 100 of the control device 10 for the internal combustion engine according to this embodiment. FIG. 6 is a flowchart based on the control block diagram shown in FIG. 5. FIG. 7 is a diagram for explaining a temperature change in the injector drive element 92 in the excess temperature region due to the control by the control device for the internal combustion engine according to this embodiment.

As shown in FIG. 5, (the microcomputer 100 of) the control device 10 includes at least driving-state detection means 101, heat-generation-suppression control means 104, heat-generation-suppression-control releasing means 107, information means 108, and shutdown means 109.

The driving-state detection means 101 is means for, as a sensor for detecting a driving state of the vehicle (a driving-state detection device), detecting a driving state of the vehicle on the basis of signals of the crank angle sensor 37, the fuel pressure sensor 56, the position sensor 36, the voltage detection device 95, the temperature detection device 93, and the like.

Specifically, the driving-state detection means 101 detects the number of revolutions of the internal combustion engine from the crank angle sensor 37, detects fuel pressure from the fuel pressure sensor 56, detects a gear range of the transmission 60 from the position sensor 36, and calculates vehicle speed of the vehicle driven by the internal combustion engine 80 from the number of revolutions of the internal combustion engine and the gear range. The driving-state detection means 101 detects the boosted voltage VH obtained by boosting the battery voltage VB from the voltage detection device 95 shown in FIG. 3 and detects a current value of an electric current applied to the injectors 30 from the current detection device 96. The driving-state detection means 101 calculates, when the temperature of the injector drive circuit 90 continuously exceeds the warming temperature TSET1, elapsed time from that point to the present point as a driving state according to an output signal of the temperature detection device 93. Specifically, the elapsed time corresponds to elapsed time tf shown in FIG. 7.

The heat-generation-suppression control means 104 controls the internal combustion engine 80 to suppress the heat generation of the injector drive circuit 90 on the basis of an output signal, outputted from the temperature detection device 93, for timing when a temperature condition that the temperature TIC of the injector drive circuit 90 exceeds the predetermined temperature. The heat-generation-suppression control means 104 selects, on the basis of a driving state of the vehicle, at least one parameter among an electric current applied to the injectors, fuel pressure supplied to the injectors, the number of revolutions of the internal combustion engine 80, and voltage from the battery to be boosted and also selects a parameter effective for control for performing suppression of heat generation, i.e., for suppressing the temperature TIC of the injector drive circuit. The heat-generation-suppression control means 104 controls the internal combustion engine 80 to limit (reduce) a value of the parameter.

In this embodiment, the heat-generation-suppression control means 104 controls, according to an output signal from the temperature detection device 93, the internal combustion engine 80 to suppress the heat generation of the injector drive circuit 90 when above condition (2) that the temperature TIC of the injector drive circuit exceeds the warning temperature TSET1 and is within the excess temperature region equal to or lower than the guarantee temperature TSET2 set in advance is satisfied.

Specifically, the heat-generation-suppression control means 104 includes limitation selecting means 105, boosted-voltage limitation means 106*a*, fuel-pressure limitation means 106*b*, energization-current limitation means 106*c*, and number-of-revolutions limitation means 106*d*.

The limitation selecting means 105 checks the number of revolutions of the internal combustion engine, the fuel pressure, the gear range of the transmission, the vehicle speed, the boosted voltage (value), the electric current (value) applied to the injectors, and the elapsed time after the temperature TIC of the injector drive circuit continuously exceeds the warning temperature TSET1 detected by the vehicle-driving-state detection means 101. The limitation selecting means 105 selects a parameter of the electric current applied to the injectors, the fuel pressure supplied to the injectors, the number of revolutions of the internal combustion engine, or the voltage from the battery to be boosted in order from one that least affects a driving state of the vehicle. The limitation means 106*a* to 106*d* corresponding to the selected parameters control, in order of the selection, the internal combustion engine 80 to reduce a quantity of heat generated in the injector drive element 92 of the injector drive circuit 90.

For example, when the temperature TIC of the injector drive circuit 90 exceeds the warning temperature TSET1, the limitation selecting means 105 selects, as a driving state of the vehicle, according to elapsed time after the temperature TIC of the injector drive circuit exceeds the warning temperature TSET1, the parameters that should be limited in order from one having a largest effect of suppressing the heat generation of the injector drive element 92. The heat-generation-suppression control means 104 controls the internal combustion engine 80 to limit values of the selected parameters using the four limitation means 106*a* to 106*d* corresponding to the parameters. The parameters having large effects of suppressing the heat generation can be performed by calculated by an experiment, an analysis, or the like for reproducing a heat generation state of the injector drive element 92 and controlling the internal combustion engine to actually limit the respective parameters.

Preferably, as shown in FIG. 7, the limitation selecting means 105 selects the parameters to simultaneously cause the limitation means 106*a* to 106*d* to perform limitation in order of the selection as the elapsed time tf after the temperature TIC exceeds the warning temperature TSET1 becomes longer. For example, when the parameters corresponding to the boosted-voltage limitation means 106*a*, the fuel-pressure limitation means 106*b*, the energization-current limitation means 106*c*, and the number-of-revolutions limitation means 106*d* are selected in order, the heat-generation-suppression control means 104 suppresses boosted voltage using the boosted-voltage limitation means 106*a*. When the heat generation cannot be sufficiently suppressed in the elapsed time tf (e.g., the temperature TIC does not fall below the predetermined temperature), in addition to the control of the suppression of the boosted voltage, the heat-generation-suppression control means 104 also controls suppression of fuel voltage supplied to the injectors using the fuel-pressure limitation means 106b.

In this way, the limitation selecting means 105 selects the parameters to simultaneously cause the limitation means 106a to 106d to perform limitation as the elapsed time tf after the temperature TIC exceeds the warning temperature becomes longer. Therefore, it is possible to efficiently and surely suppress the heat generation before the temperature TIC rises to the guarantee temperature TSET2.

As another form, when it is desired to secure drivability for a driver or it is desired to secure comfortableness of driving, the limitation selecting means 105 may select, as a driving state of the vehicle, on the basis of vehicle speed, parameters limited by the four limitation means 106a to 106d described later in order from one that least affects a driving state (in order from one with which the vehicle speed most hardly changes). In the same manner as the above description, the heat-generation-suppression control means 104 simultaneously performs control for suppressing values of the parameters using the limitation means 106a to 106d in order of the selected parameters according to elapsed time after the temperature TIC of the injector drive circuit exceeds the warning temperature TSET1.

The means for limiting the parameters selected by the limitation selecting means 105 includes the four means described below.

The boosted-voltage limitation means 106a is means for controlling the internal combustion engine 80 to limit (reduce) a value of the boosted voltage VH in order to suppress the heat generation of the injector drive element 92 when boosted voltage is selected as a parameter by the limitation selecting means 105. A method of limiting the output of the boosted voltage VH is not specifically limited as long as the heat generation is suppressed and drivability is not spoiled. For example, when the boosted voltage VH is equal to or higher than a certain set value, an upper limit value of the boosted voltage VH is limited from the battery voltage VB in order to limit the peak current Ip and feed the peak current Ip to the injectors 30 shown in FIG. 4.

Figure 4:
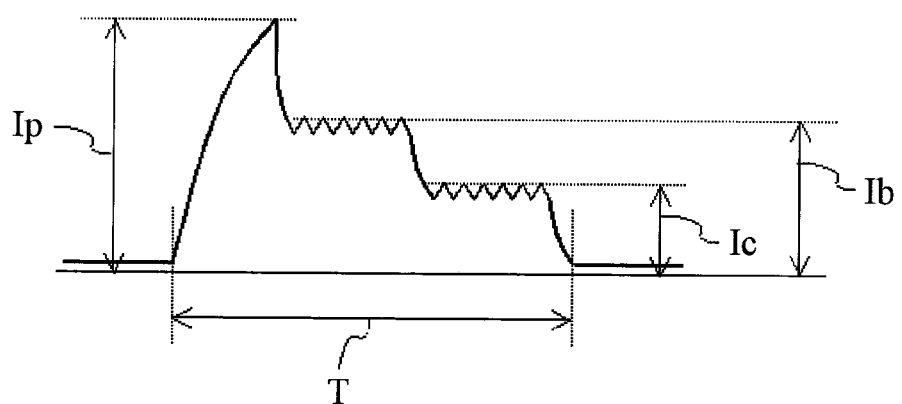
FIG. 4 is a diagram for explaining a waveform of an energization current applied to an injector that injects fuel into the internal combustion engine.

Consequently, the peak current Ip applied to the injectors 30 shown in FIG. 4 falls. Therefore, power consumption caused by ON resistance (resistance due to energization) of the injector drive element 92 is suppressed and a quantity of heat generated in the injector drive element 92 is suppressed. It is possible to suppress the heat generation of the boosting circuit 91 itself by limiting the boosting voltage and suppress a temperature rise of the injector drive element 92 due to radiation heat from the boosting circuit 91.

When the peak current Ip applied to the injectors 30 is reduced by the boosted-voltage limitation means 106a, it is likely that the opening of the valves of the injectors 30 decreases, an initial fuel injection amount decreases, fuel injection diffusion in the cylinders is deteriorated, and fuel efficiency and exhaust gas emission are deteriorated. Therefore, in order to prevent the deterioration, it is preferable to adjust factors of fuel control for the internal combustion engine 80 in a state in which the peak current Ip applied to the injectors 30 is reduced and perform control to stop the deterioration in the fuel efficiency and the exhaust gas emission.

The fuel-pressure limitation means 106b is means for controlling the internal combustion engine 80 to limit (reduce), as a parameter, a value of fuel pressure supplied to the injectors 30 in order to suppress the heat generation of the injector drive element 92 when fuel pressure is selected as a parameter by the limitation selecting means 105. Specifically, when the fuel pressure is equal to or larger than a set value, the fuel-pressure limitation means 106b controls the high-pressure or low-pressure fuel pumps 51 and 59 to lower the fuel pressure and limit an upper limit value of the fuel pressure. This makes it possible to perform fuel injection with a small injector energization current. As a result, it is possible to suppress power consumption caused by ON resistance of the injector drive element 92 and suppress a quantity of heat generated in the injector drive element 92.

When the fuel pressure is lowered by the fuel-pressure limitation means 106b, since fuel injection pressure falls, fuel diffusion in the cylinders is deteriorated and fuel efficiency and exhaust gas emission are deteriorated. In order to prevent the deterioration, it is preferable to adjust factors of fuel control for the internal combustion engine in a state in which the fuel pressure is lowered and stop the deterioration in the fuel efficiency and the exhaust gas emission.

The energization-current limitation means 106c is means for controlling the internal combustion engine 80 to limit (reduce) a value of an electric current that should be applied to the injectors 30 in order to suppress the heat generation of the injector drive element 92 when an energization current is selected as a parameter by the limitation selecting means 105. When an injector energization current is equal to or larger than a certain set value, the energization-current limitation means 106c reduces the magnitude of the driving signal Sc from the microcomputer 100 and limit an upper limit value of the injector energization current. This makes it possible to reduce the injector energization current, suppress power consumption caused by ON resistance of the injector drive element 92, and suppress a quantity of heat generated in the injector drive element 92.

When the injector energization current is reduced by the energization-current limitation means 106c, the opening of the valves of the injectors 30 decreases, a fuel injection amount decreases, fuel injection diffusion in the cylinders is deteriorated, and fuel efficiency and exhaust gas emission are deteriorated. Therefore, in order to prevent the deterioration, it is preferable to adjust factors of fuel control for the internal combustion engine such as injector energization time T shown in FIG. 4 in a state in which the injector current is reduced and stop the deterioration in the fuel efficiency and the exhaust gas emission.

The number-of-revolutions limitation means 106d is means for controlling the internal combustion engine by limiting a value of the number of revolutions of the internal combustion engine (specifically, to reduce the number of revolutions) in order to suppress the heat generation of the injector drive element 92 when the number of revolutions is selected as a parameter by the limitation selecting means 105. Specifically, when a gear range of the transmission 60 is not at the top, the number-of-revolutions limitation means 106d issues a command for raising the gear range from the control device for the internal combustion engine to a transmission control device and raises the gear range of the transmission 60. On the other hand, the number-of-revolutions limitation means 106d adjusts a fuel injection amount and the like, controls the internal combustion engine, and reduces the number of revolutions of the internal combustion engine to fix vehicle speed. Consequently, an injector energization frequency is suppressed, power consumption caused by ON resistance of the injector drive element 92 is suppressed, and a frequency of occurrence of surge is reduced when the injectors are off. This makes it possible to suppress a quantity of heat generated in the injector drive element.

As another form, the number-of-revolutions limitation means 106d may control a fuel injection amount, an intake air amount, and the like and limit an upper limit value of the number of revolutions of the internal combustion engine when the number of revolutions of the internal combustion engine is equal to or larger than a certain set value. It is possible to suppress a quantity of heat generated in the injector drive element 92 by reducing the number of revolutions of the internal combustion engine because an injector energization frequency is suppressed, power consumption caused by ON resistance of the injector drive element 92 is suppressed, and a frequency of occurrence of surge is reduced when the injectors 30 are off.

In the limitation means 106a to 106d, an amount for limiting an output of selected limitation means may be adjusted according to elapsed time after the temperature TIC of the injector drive circuit exceeds the warning temperature TSET1. In this case, it is preferable to increase the amount for limiting the output as the elapsed time becomes longer.

The heat-generation-suppression-control releasing means 107 is means for causing, when the temperature of the injector drive element 92 is lowered to be equal to or lower than the warning temperature TSET1 by the heat-generation-suppression control means 104, the heat-generation-suppression control means 104 to continuously perform control (heat generation suppression control) for the internal combustion engine 80 to suppress heat generation until predetermined time (time te shown in FIG. 7) elapses from a point when the temperature falls to be equal to or lower than the warning temperature TSET1 and, after the predetermined time elapses, releasing the control of suppression of heat generation.

In this way, even when the temperature of the injector drive element 92 falls to be equal to or lower than the warning temperature TSET1, the heat generation suppression control is continued until the predetermined time elapses. Therefore, it is possible to prevent a situation in which the injector drive element 92 generates heat again and the temperature thereof quickly rises to be equal to or higher than the warning temperature. For example, as a method of releasing the heat generation suppression control, it is possible to release the control of the heat generation suppression by returning the upper limit values to the original values in the limitation means.

The information means 108 is means for informing, when a temperature condition that temperature is within an excess temperature region is satisfied, the satisfaction of the temperature condition, informing, when the satisfaction of the temperature condition changes to dissatisfaction, information concerning the dissatisfaction of the temperature condition, and informing, when the heat generation suppression control is released by the heat-generation-suppression-control releasing means 107, the release of the heat generation suppression control.

Specifically, when an output signal indicating that the temperature of the injector drive element (the temperature of the injector drive circuit) exceeds the warning temperature is received from the temperature detection device 93, the information means 108 outputs a warning signal to the information device 64 (the navigation system, etc.) in order to inform the driver that the temperature of the injector drive element is in the excess temperature region by lighting a lap or emitting alarm sound from speakers. Consequently, for example, the driver does not unnecessarily step in the accelerator or stops the vehicle. Therefore, it is possible to suppress the heat generation of the injector drive element.

The shutdown means 109 is means for shutting down the driving signal Sc for driving the injector drive circuit using the temperature detection device 93 and suspending fuel injection by the injectors 30 when the temperature TIC of the injector drive circuit exceeds the guarantee temperature TSET2.

FIG. 6 is a control flowchart based on the control block diagram shown in FIG. 5. A control flow of the control device for the internal combustion engine according to this embodiment is explained below.

First, during normal control of the internal combustion engine, in step 301, the control device 10 compares, using the temperature detection device 93, the temperature TIC of the injector drive circuit of the driving circuit and the warning temperature TSET1. Specifically, the control device 10 compares, using the excess temperature diagnosis function of the temperature detection device 93, the temperature TIC and the warning temperature TSET1. When the detected temperature TIC is equal to or lower than the warning temperature TSET1, the control device 10 continues to perform the normal control and, after predetermined time elapses, performs the processing in step 301 again.

On the other hand, when the microcomputer 100 detects a signal indicating that the detected temperature TIC exceeds the warning temperature TSET1, the control device 10 proceeds to step 302. The control device 10 outputs a warning signal to the information device 64 (the navigation system, etc.) to inform the driver that the temperature of the injector drive element is in the excessive temperature region by performing display on a screen of the car navigation system, lighting the lamp, or emitting alarm sound from the speakers using the information means 108. The control device 10 proceeds to step 303.

In step S303, the control device 10 detects, using the driving-state detection means 101, an electric current applied to the injectors, fuel pressure supplied to the injectors, the number of revolutions of the internal combustion engine, voltage from the battery to be boosted, or the speed of the vehicle and proceeds to step 304.

In step 304, the control device 10 performs control of the internal combustion engine using the heat-generation-suppression control means 104 in order to suppress the heat generation of the injector drive element. Specifically, first, the control device 10 sequentially selects, using the limitation selecting means 105, parameters of an electric current applied to the injectors, fuel pressure supplied to the injectors, the number of revolutions of the internal combustion engine, and voltage from the battery to be boosted according to elapsed time after the temperature TIC of the injector drive circuit calculated by the driving-state detection means 101 exceeds the warning temperature TSET1.

The control device 10 performs heat generation suppression control using any one of the limitation means 106a to 106d corresponding to the selected parameter in order to limit the selected parameter. When the suppression of heat generation is not sufficient (e.g., when the temperature of the injector drive circuit 90 does not fall to the warning temperature TSET1 within predetermined time after the heat generation suppression control is started), the control device 10 limits a value of a parameter selected earlier and limits a value of a parameter selected next as well to perform the heat generation suppression control. Since the parameters are limited together in order of the selection, it is possible to surely suppress the heat generation of the injector drive element.

The control device 10 proceeds to step 305. When the temperature TIC of the injector drive circuit falls to be equal to or lower than the warning temperature TSET1, i.e., when the satisfaction of the condition in step 301 changes to dissatisfaction, the control device 10 continuously performs the heat generation suppression control until predetermined time elapses after the satisfaction of the condition changes to the dissatisfaction and proceeds to step 306. After the time elapses, the control device 10 releases the heat generation suppression control using the heat-generation-suppression-control releasing means 107 and informs, using the information means 108, the driver that the control device 10 returns to the normal control.

On the other hand, when the temperature TIC of the injector drive circuit exceeds the warning temperature TSET1, the control device 10 proceeds to step 307 and judges, on the basis of an output signal of the temperature detection device 93, whether the detected temperature TIC exceeds the guarantee temperature TSET2. When the temperature TIC exceeds the guarantee temperature TSET2, the control device 10 shuts down, using the shutdown means 109, the driving signal Sc for driving the injector drive circuit. In step 309, the control device 10 warns, using the information means 108, the driver that, for example, the engine is about to stop.

In this way, as shown in FIG. 7, the control device 10 performs the heat generation suppression control from a point Ta when the temperature TIC of the injector drive circuit exceeds the warning temperature TSET1. Therefore, at a point tb after time Tf during which the temperature TIC continuously exceeds the warning temperature, the temperature TIC converges with the temperature rise of T3 from the warning temperature TSET1. Thereafter, the temperature TIC of the injector drive circuit falls. Even when the temperature TIC of the injector drive circuit falls to be equal to or lower than the warning temperature TSET1 at a point tc, since the heat generation suppression control is performed for predetermined time, it is possible to lower the detected temperature TIC to be equal to or lower than the warning temperature TSET1 even at a point td after the elapse of time te.

In this way, a parameter limited to be outputted is selected on the basis of a driving state of the vehicle such as vehicle speed and the selected parameter is limited on the basis of timing when the temperature condition that the temperature of the injector drive circuit 90 exceeds the predetermined temperature is satisfied. Therefore, even when a sudden temperature rise occurs, it is possible to efficiently suppress the heat generation of the injector drive circuit 90 and prevent the suppression of the heat generation from affecting a driving state of the vehicle. Since the control of the internal combustion engine is performed to limit values of the parameters in the order of selection, it is possible to more surely suppress the heat generation of the injector drive circuit 90. Since the driver is informed of excess temperature region information through the lamp, the speakers, or the navigation screen display beforehand, the driver can try to drive the vehicle with heat generation suppressed.

Since the temperature detection device 93 has the excess temperature diagnosis function, the temperature detection device 93 detects only the excess temperature region (only timing when the temperature condition that the temperature of the injector drive circuit exceeds the predetermined temperature is satisfied). Therefore, since the microcomputer 100 does not perform an arithmetic operation on a real time basis, it is possible to suppress an arithmetic operation load in the microcomputer 100.

Second Embodiment

Figure 8:
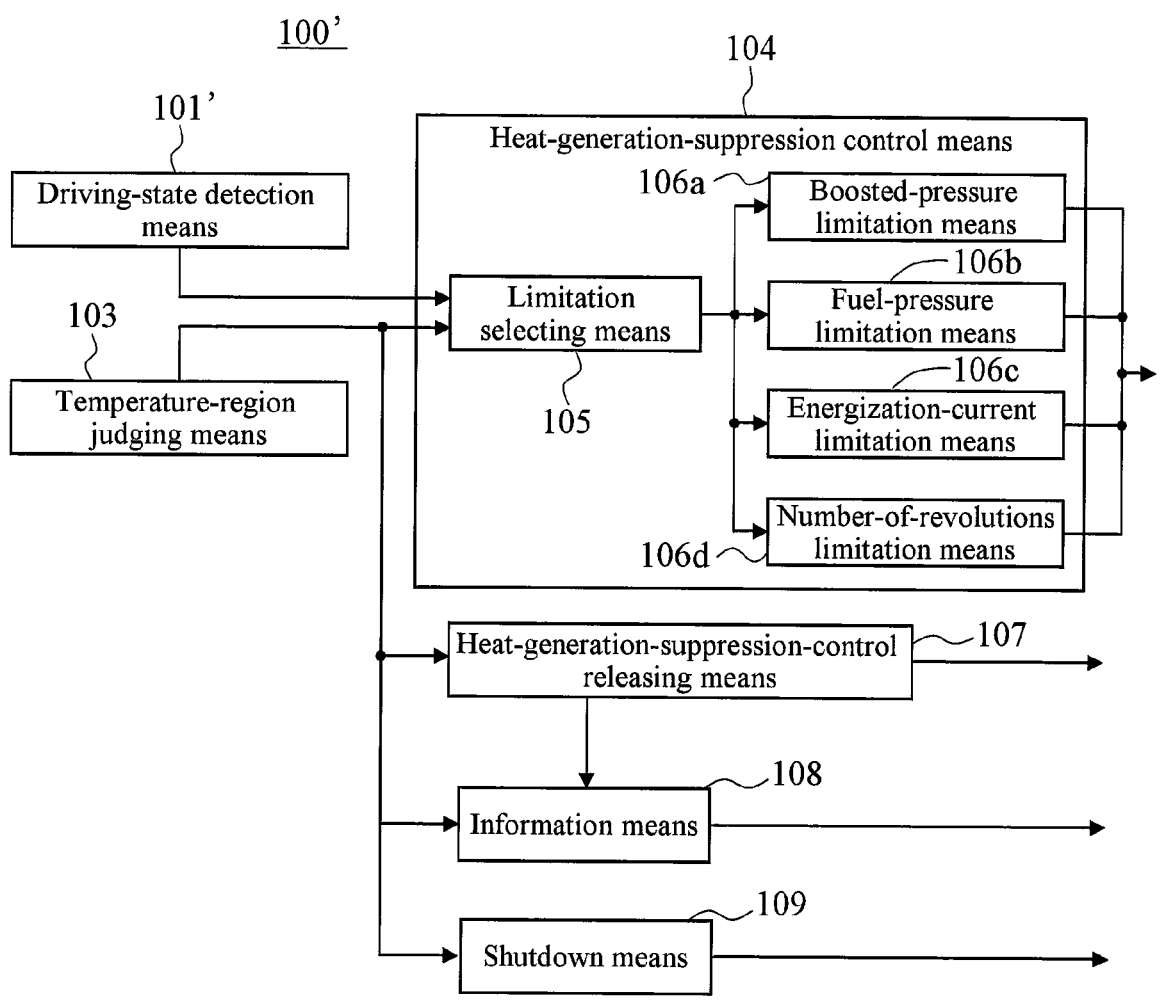
FIG. 8 is a control block diagram of a microcomputer of a control device for an internal combustion engine according to a second embodiment of the present invention.

FIG. 8 is a control block diagram of control performed by a microcomputer 100' of the control device 10 for an internal combustion engine according to a second embodiment of the present invention.

The control device for an internal combustion engine according to the second embodiment is different from the control device for an internal combustion engine according to the first embodiment in that a function of a temperature detection device for the injector drive element 92, a function of driving-state detection means 101' in the microcomputer, and temperature-region judging means 103 are provided anew. In the first embodiment, the temperature detection device 93 has the excess temperature diagnosis function. The excess temperature diagnosis function has the two temperature thresholds. When the temperature TIC of the injector drive circuit 90 exceeds the warning temperature TSET1 or the guarantee temperature TSET2, the temperature detection device 93 outputs a signal to the microcomputer. However, in the second embodiment, the temperature detection device 93 is a device that detects the temperature itself of the injector drive circuit 90. The temperature detection device 93 is connected to the microcomputer 100' such that a detection signal of the detected temperature (the temperature of the injector drive circuit) TIC is outputted to the microcomputer 100'.

In the first embodiment, the driving-state detection means 101' calculates elapsed time after the temperature TIC of the injector drive circuit exceeds the predetermined temperature. On the other hand, in the second embodiment, the driving-state detection means 101' calculates, as a driving state of a vehicle, a difference between the predetermined temperature and the detected temperature TIC.

The microcomputer 100' further includes temperature-region judging means 103 and judges in which temperature region the temperature detected by the temperature detection device is. Specifically, as shown in FIG. 7, the temperature-region judging means 103 judges whether the detected temperature TIC is (1) equal to or lower than the warning temperature TSET1 set in advance, (2) exceeds the warning temperature TSET1 and is equal to or lower than the guarantee temperature TSET2 (the excess temperature region) set in advance, or (3) exceeds the guarantee temperature TSET2.

As in the first embodiment, the heat-generation-suppression control means 104 selects, when it is judged by the temperature-region judging means 103 that the detected temperature TIC of (2) described above exceeds the warning temperature TSET1, as a driving state of the vehicle, parameters corresponding to the four limitation means 106a to 106d in order from one having a largest effect of suppressing the heat generation of the injector drive element 92 according to a difference between the warning temperature TSET1 and the detected temperature TIC. In this case, even when time tf during which the temperature TIC exceeds the warning temperature is short and a sudden temperature rise occurs as shown in FIG. 7, it is possible to efficiently and surely suppress heat generation before the temperature TIC rises to the guarantee temperature TSET2. The limitation means having a large effect of suppressing the heat generation can be selected by an experiment, an analysis, or the like for reproducing a heat generation state of the injector drive element 92 and controlling the internal combustion engine to actually limit the parameters.

As in the first embodiment, it is also possible that the parameters limited to be outputted are selected on the basis of a driving state of the vehicle such as vehicle speed (more specifically, in order from one with which the vehicle speed most hardly changes) and the selected parameters are limited on the basis of the detected temperature. In this case, even when a sudden temperature rise occurs, it is possible to efficiently suppress the heat generation of the injector drive circuit 90 and prevent the suppression of the heat generation from affecting a driving state of the vehicle.

Third Embodiment

A control device for an internal combustion engine according to a third embodiment of the present invention is different from the control device for an internal combustion engine according to the second embodiment in a method of calculating the temperature of the driving circuit of the injector drive element 92. In the second embodiment, the detected temperature TIC is calculated from a signal of the temperature detection device 93. However, in the third embodiment, temperature is estimated from detected temperature of an injector drive circuit. Specifically, in the temperature estimation, the temperature of the injector drive circuit 90 after the elapse of predetermined time from the detection of the temperature on the basis of the detected temperature TIC. The temperature-region judging means 103 judges a temperature region of the estimated temperature sing the estimated temperature instead of the detected temperature TIC and the heat-generation-suppression control means 104 performs heat generation suppression control.

Figure 9:
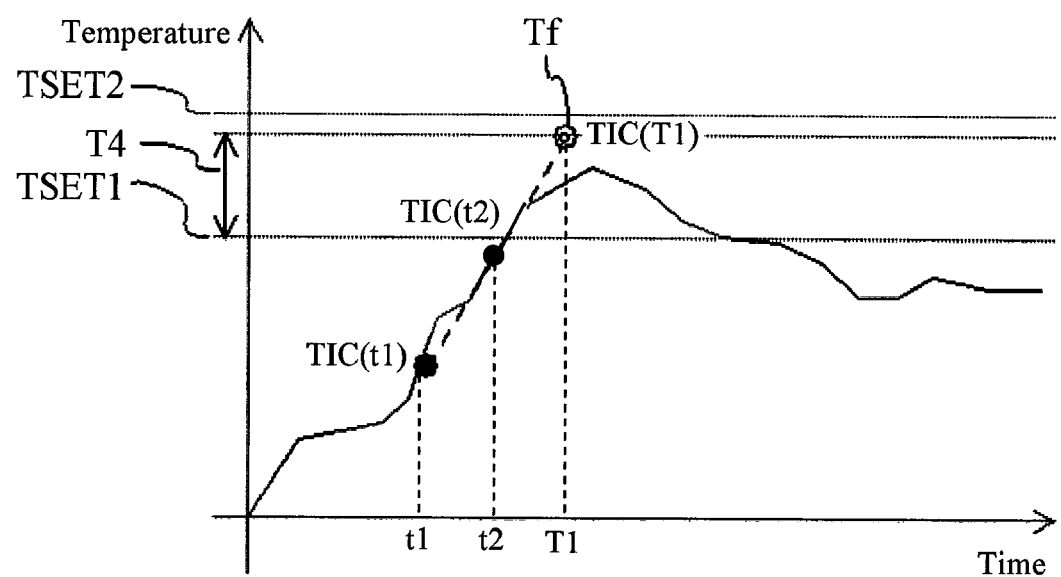
FIG. 9 is a diagram for explaining a temperature change in an injector drive element in an excess temperature region due to the control by a control device for an internal combustion engine according to the third embodiment.

Specifically, in the estimation of temperature, as indicated by FIG. 9 and Formula 1, the temperature of the injector drive circuit at a point T1 after the elapse of the predetermined time from the detection of the temperature is estimated from detected temperatures TIC(1) and TIC(t2) at a point t1 and a point t2.

$$TIC(T1)=(TIC(t2)-TIC(t1))/(t2-t1) \times T1+TIC(t2) \qquad \text{Formula 1}$$

When it is judged by the temperature-region judging means that a temperature condition that estimated temperature TIC(T1) exceeds the warning temperature is satisfied, as in the first embodiment, the heat generation suppression control is performed. In this case, for example, as in the first embodiment, when the estimated temperature TIC(T1) exceeds the warning temperature TSET1, a parameter may be selected according to a difference between the warning temperature TSET1 and the estimated temperature TIC(T1). Besides, a method of selecting a parameter and the like are the same as those described in the first embodiment and the second embodiment.

The several embodiments of the present invention have been explained in detail. However, the present invention is not limited to the embodiments. Various modifications of the embodiments are possible without departing from the spirit of the present invention described in claims The excess temperature diagnosis by the internal combustion engine control device according to the present invention can be widely applied not only to control devices for automobiles, motorbikes, agricultural machines, industrial machines, ships, and the like but also to general electronic control apparatuses that drive loads.

What is claimed is:

1. A control device for an internal combustion engine comprising:
an injector drive circuit that drives an injector that injects fuel into the internal combustion engine; and
a temperature detection device that detects timing when a temperature condition that temperature of the injector drive circuit exceeds predetermined temperature is satisfied, wherein
the control device includes heat-generation-suppression control means for performing control for suppressing heat generation of the injector drive circuit, and
the heat-generation-suppression control means selects, on the basis of a driving state of a vehicle, at least one parameter among an electric current applied to the injector, fuel pressure supplied to the injector, a number of revolutions of the internal combustion engine, and voltage from a battery to be boosted and performs control for limiting a value of the selected parameter on the basis of the timing.

2. The control device for an internal combustion engine according to claim 1, wherein
the control device calculates, as a driving state of the vehicle, time elapsed from the timing when the temperature of the injector drive circuit exceeds the predetermined temperature, and
the heat-generation-suppression control means selects the parameter according to the elapsed time.

3. The control device for an internal combustion engine according to claim 1, wherein the heat-generation-suppression control means sequentially selects the parameters according to a driving state of the vehicle and performs control for limiting values of the parameters in the order of the selection.

4. The control device for an internal combustion engine according to claim 1, wherein
the control device calculates vehicle speed as a driving state of the vehicle, and
the heat-generation-suppression control means selects the parameters on the basis of the vehicle speed.

5. The control device for an internal combustion engine according to claim 1 wherein the heat-generation-suppression control means continuously performs, when the satisfaction of the temperature condition changes to dissatisfaction, the heat generation suppression control until predetermined time elapses after the satisfaction changes to the dissatisfaction.

6. The control device for an internal combustion engine according to claim 1 further comprising information means for informing, when the temperature condition is satisfied, the satisfaction of the temperature condition.

7. The control device for an internal combustion engine according to claim 6, wherein the information means informs, when the satisfaction of the temperature condition changes to dissatisfaction, the dissatisfaction of the temperature condition.

8. A control device for an internal combustion engine comprising:
an injector drive circuit that drives the injector that injects fuel into the internal combustion engine; and
a temperature detection device that detects temperature of the injector drive circuit, wherein
the control device includes heat-generation-suppression control means for performing control for suppressing the heat generation of the injector drive circuit, and
the heat-generation-suppression control means selects, on the basis of a driving state of a vehicle, at least one parameter among an electric current applied to the injector, fuel pressure supplied to the injector, a number of revolutions of the internal combustion engine, and voltage from a battery to be boosted and performs control for limiting a value of the selected parameter on the basis of the detected temperature.

9. The control device for an internal combustion engine according to claim 8, wherein
the control device calculates, as the driving state of the vehicle, time elapsed after the detected temperature exceeds the predetermined temperature,
and the heat-generation-suppression control means selects the parameter according to the elapsed time.

10. The control device for an internal combustion engine according to claim 8, wherein the control device calculates, as the driving state of the vehicle, a difference between the predetermined temperature and the detected temperature, and the heat-generation-suppression control means selects the parameter according to the difference.

11. The control device for an internal combustion engine according to claim 8, further comprising temperature estimating means for estimating temperature of the injector drive circuit after elapse of predetermined time from detection time of the temperature, wherein the control device performs control for limiting a value of the parameter when a temperature condition that the estimated temperature exceeds the predetermined temperature is satisfied.

12. The control device for an internal combustion engine according to claim 8, wherein the heat-generation-suppression control means sequentially selects the parameters according to a driving state of the vehicle and performs control for limiting values of the parameters in the order of the selection.

13. The control device for an internal combustion engine according to claim 8, wherein the control device calculates vehicle speed as a driving state of the vehicle, and the heat-generation-suppression control means selects the parameters on the basis of the vehicle speed.

14. The control device for an internal combustion engine according to claim 8, wherein the heat-generation-suppression control means performs control for limiting a value of the parameter when a temperature condition that the detected temperature exceeds predetermined temperature is satisfied.

15. The control device for an internal combustion engine according to claim 14 wherein the heat-generation-suppression control means continuously performs, when the satisfaction of the temperature condition changes to dissatisfaction, the heat generation suppression control until predetermined time elapses after the satisfaction changes to the dissatisfaction.

16. The control device for an internal combustion engine according to claim 14 further comprising information means for informing, when the temperature condition is satisfied, the satisfaction of the temperature condition.

* * * * *